June 8, 1965  D. H. BRIGGEMAN ETAL  3,188,281
PRODUCTION OF METHYL DICHLOROPHOSPHINE OXIDE
Filed March 31, 1954
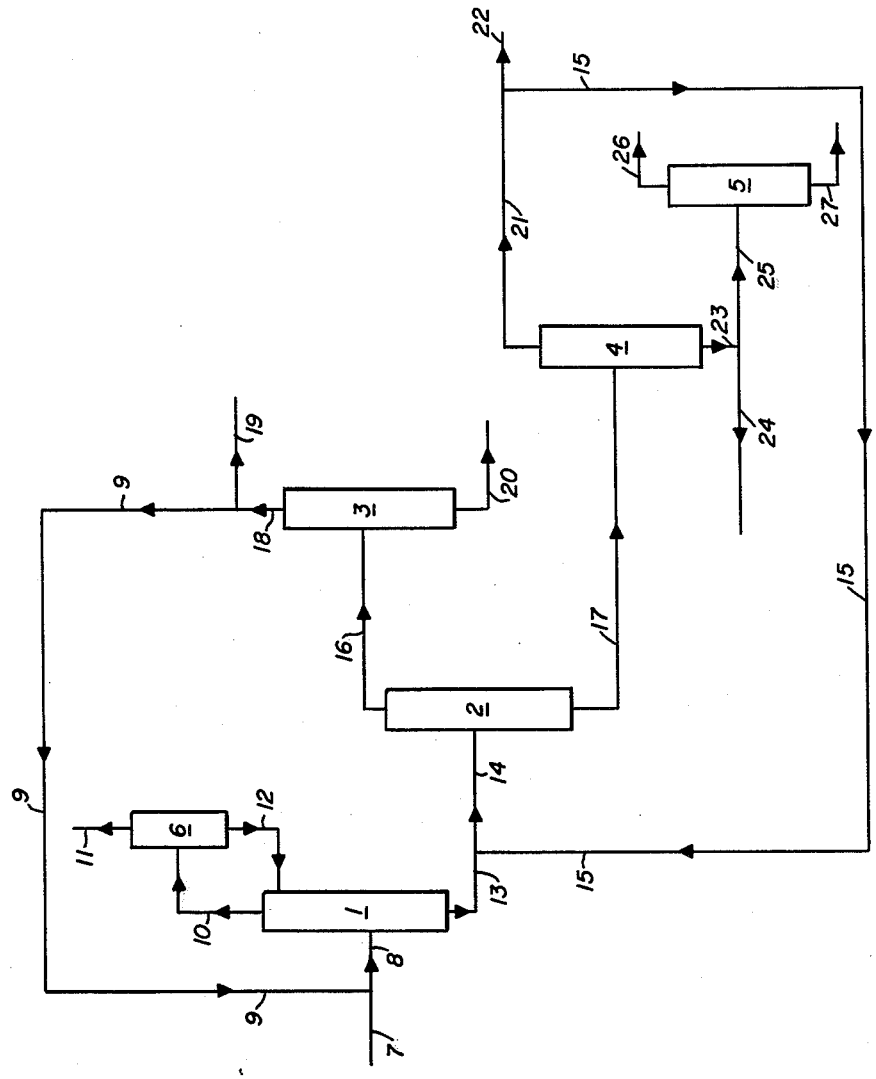
INVENTORS
DONALD H. BRIGGEMAN
ALAN LONGACRE
CHARLES J. SMITH, JR.
BY  Walter D. Hunter
AGENT

United States Patent Office 3,188,281  
Patented June 8, 1965

3,188,281  
PRODUCTION OF METHYL DICHLORO-PHOSPHINE OXIDE  
Donald H. Briggeman, Niagara Falls, N.Y., Alan Longacre, Whittier, Calif., and Charles J. Smith, Jr., Grand Island, N.Y., assignors to Olin Mathieson Chemical Corporation, a corporation of Virginia  
Filed Mar. 31, 1954, Ser. No. 419,982  
2 Claims. (Cl. 202—40)

Our invention relates to a method for the recovery of methyl dichlorophosphine oxide, $CH_3POCl_2$, hereinafter referred to as "dichloride," from a complex reaction mixture which results in the production of that compound by the phosgenation of a prior complex reaction mixture.

Methanol and phosphorus trichloride react at temperatures of about 0 to 20° C. to form dimethyl hydrogen phosphite according to the following equation:

$$3CH_3OH + PCl_3 \longrightarrow (CH_3O)_2\overset{O}{\underset{}{P}}-H + CH_3Cl + 2HCl$$

Pyrolysis of dimethyl hydrogen phosphite at temperatures of about 250° C. and higher, particularly in an atmosphere of nitrogen, yields a complex mixture known as "pyro mix" usually containing approximately the following proportion of principal components:

| Name | Formula | Approx. percent |
|---|---|---|
| Methyl methane phosphonate | 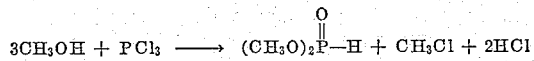 | 20–30 |
| Di(methyl phosphonic acid) | $CH_3-\overset{O}{\underset{OH}{P}}-O-\overset{O}{\underset{OH}{P}}-CH_3$ | ,50–60 |
| Pyrophosphoric acid | $HO-\overset{O}{\underset{OH}{P}}-O-\overset{O}{\underset{OH}{P}}-OH$ | 15–20 |
|  |  | 100 |

Lutz and Smith application Serial No. 417,962, filed March 22, 1954, describes a method for the preparation of methyl dichlorophosphine oxide from pyro mix by reacting the pyro mix in liquid phase with phosgene while the pyro mix is in admixture with methyl dichlorophosphine oxide in a weight amount exceeding the weight of the pyro mix, the methyl dichlorophosphine oxide serving as a solvent for the pyro mix and phosgene which are employed as reactants. The carrying out of the phosgenation of the pyro mix results in the preparation of a complex reaction mixture which contains carbon dioxide, hydrogen chloride, methyl chloride, excess phosgene, phosphorus oxychloride, tetramethylphosphonium chloride and higher boiling materials, as well as the desired methyl dichlorophosphine oxide. The primary object of our invention is to provide the art with an effective and economical method for the recovery of methyl dichlorophosphine oxide from this complex type of phosgenation reaction product.

The solution to the problem of recovering methyl dichlorophosphine oxide from a reaction mixture of the type just indicated is not easily arrived at. In the first place, the reaction mixture is of a highly complex nature, containing as it does carbon dioxide, hydrogen chloride, methyl chloride, excess phosgene, phosphorus oxychloride, methyl dichlorophosphine oxide, tetramethylphosphonium chloride and higher boiling materials. In addition, the phosgenation reaction mixture is an extremely corrosive one, so that from the standpoint of plant design it is highly desirable to employ a process in which glass-lined equipment can be utilized. This means that pressures in the recovery operation should not exceed the order of about 150 p.s.i.a. Moreover, temperature conditions involved in a recovery operation should not exceed the order of about 300° F. in order to avoid decomposition caused by the use of higher temperatures. Also, tetramethylphosphonium chloride is a material of relatively high melting point.

In accordance with our invention, we have been able to devise a process meeting the aforementioned requirements for the recovery of methyl dichlorophosphine oxide from a complex mixture containing that compound in admixture with carbon dioxide, hydrogen chloride, methyl chloride, excess phosgene, phosphorus oxychloride, tetramethylphosphonium chloride and small amounts of higher boiling materials. The method which we have devised involves introducing the complex phosgenation mixture and additional methyl chloride as feed into a first fractionating zone which is operated at moderate pressure and taking as overhead the carbon dioxide, hydrogen chloride, and methyl chloride present in the feed to this fractionating zone. The overhead vapors pass through a partial condenser from which the carbon dioxide and hydrogen chloride are removed in vapor form and in which methyl chloride is condensed for return as reflux. The bottoms from the first fractionating zone consist essentially of methyl chloride, excess phosgene, phosphorus oxychloride, "dichloride," tetramethylphosphonium chloride and higher boiling materials.

The bottoms from the first fractionating zone and additional phosphorus oxychloride are introduced as feed into a second fractionating zone which is operated at about atmospheric pressure to provide an overhead consisting essentially of methyl chloride and the excess phosgene and a bottoms consisting essentially of phosphorus oxychloride, "dichloride," tetramethylphosphonium chloride and higher boiling materials.

The overhead from the second fractionating zone is introduced into a third fractionating zone again operated at moderate pressure in which methyl chloride is taken as an overhead fraction and phosgene is taken as a bottoms fraction. A portion of the methyl chloride taken as overhead in the third fractionating zone is a suitable source of the methyl chloride introduced into the first fractionating zone as feed, and the phosgene taken as bottoms from the third fractionating zone can suitably be used for the further phosgenation of pyro mix in order to produce additional quantities of methyl dichlorophosphine oxide.

The bottoms from the second fractionating zone are introduced into a fourth fractionating zone which is operated under a vacuum to provide as an overhead phosphorus oxychloride, a portion of which is a suitable source for introduction into the second fractionating zone as feed, and a bottoms consisting essentially of methyl dichlorophosphine oxide, tetramethylphosphonium oxide and higher boiling materials. If desired the bottoms from the fourth fractionating zone can be introduced into a fifth fractionating zone operated under a high vacuum for purification of the methyl dichlorophosphine oxide, that compound being taken overhead and the remaining materials introduced into that zone being taken as bottoms.

For a more complete understanding of the method of our invention reference is made to the attached drawing which depicts one specific embodiment. In the drawing, the numerals 1, 2, 3, 4 and 5 designate, respectively, the first, second, third, fourth and fifth fractionating zones, which are suitably plate or packed distillation columns. The numeral 6 designates the partial condenser associated with the first fractionating zone. The complex phosgenation reaction mixture containing carbon dioxide, hydrogen chloride, methyl chloride, excess phosgene, phosphorus oxychloride, "dichloride," tetramethylphosphonium chloride and higher boiling materials is introduced into distillation column 1 through lines 7 and 8, additional methyl chloride also being introduced through line 9. The overhead from column 1 passes through line 10 into partial condenser 6, from which carbon dioxide and hydrogen chloride are taken overhead through line 11 and from which methyl chloride is returned to column 1 as reflux through line 12. The bottoms from column 1, consisting essentially of methyl chloride, the excess phosgene, phosphorus oxychloride, "dichloride," tetramethylphosphonium chloride and higher boiling materials, are withdrawn through line 13 and introduced by means of line 14 into column 2 together with additional phosphorus oxychloride from line 15. The vapors from distilling column 2 are taken overhead through line 16 and consist essentially of methyl chloride and the excess phosgene, while the bottoms from column 2 are withdrawn through line 17 and consist essentially of phosphorus oxychloride, "dichloride," tetramethylphosphonium chloride and higher boiling materials. The overhead from column 2 is introduced by means of line 16 into column 3 from which methyl chloride is taken overhead by means of line 18, a portion of the methyl chloride being withdrawn from the entire distillation system by means of line 19 and the remainder being recycled to column 1 by means of line 9. The bottoms from column 3 consisting essentially of phosgene are withdrawn through line 20, preferably being used for the phosgenation of further quantities of pyro mix. In column 4, phosphorus oxychloride is taken overhead through line 21, a portion of the phosphorus oxychloride being withdrawn from the entire distillation system through line 22 and the remainder being recycled by means of line 15 for introduction as feed to column 2 with the bottoms withdrawn from column 1 by means of line 13. The bottoms from column 4 consisting essentially of "dichloride," tetramethylphosphonium chloride and higher boiling materials are withdrawn through line 23. In the specific embodiment shown in the drawing, a portion of the bottoms from column 4 is withdrawn from the entire distillation system for use in the phosgenation of further quantities of pyro mix as described in the aforementioned Lutz and Smith application and the remainder being introduced by means of line 25 into column 5 from which the "dichloride" in purified form is removed as overhead through line 26, bottoms comprising tetramethylphosphonium chloride and higher boiling materials being removed through line 27. In operating column 5, the tetramethylphosphonium chloride is periodically removed in slurry form from the column through the bottom outlet, build-up of compound being ascertained by a rise in the bottoms temperature. Columns 1 and 3 are operated at moderate pressure, column 2 at about atmospheric pressure, and columns 4 and 5 under vacuum, column 5 being operated at a high vacuum.

As illustrating a specific operation falling within the scope of our invention, through line 8 there is introduced into column 1 a mixture consisting essentially of carbon dioxide, hydrogen chloride, methyl chloride, phosgene, phosphorus oxychloride, "dichloride," and tetramethylphosphonium chloride in the following amounts, respectively, for each ingredient per day: 568 pounds, 315 pounds, 505 pounds, 1277 pounds, 307 pounds, 6930 pounds and 89 pounds. Of the methyl chloride introduced through line 8, 445 pounds per day is introduced into column 1 through line 9. The remainder introduced into column 1 through line 8 is introduced through line 7 as an ingredient of the phosgenation mixture. Column 1 is operated at a pressure of 150 p.s.i.a. and with a reboiler temperature of 264° F. Partial condenser 6 is operated at −1° F. As overhead through line 11 there are taken 568 pounds of carbon dioxide per day, 315 pounds of hydrogen chloride per day, 60 pounds of methyl chloride per day and 3 pounds of phosgene per day, methyl chloride and a very small amount of phosgene also being returned to column 1 from partial condenser 6 through line 12 to serve as reflux. As bottoms through line 13 there are taken 445 pounds of methyl chloride per day, 1274 pounds of phosgene per day, 307 pounds of phosphorus oxychloride per day, 6930 pounds of "dichloride" per day and 89 pounds of tetramethylphosphonium chloride per day.

The amount of phosphorus oxychloride introduced into column 2 through line 15 amounts to 1228 pounds per day. When column 2 is operated at a pressure of 16 p.s.i.a., a total condenser temperature of 16° F. and a reboiler temperature of 300° F., the overhead taken through line 16 amounts to 445 pounds of methyl chloride per day, 1273 pounds of phosgene per day and 15 pounds of phosphorus oxychloride per day and the bottoms taken through line 17 amount to one pound of phosgene per day, 1520 pounds of phosphorus oxychloride per day, 6930 pounds of "dichloride" per day and 89 pounds of tetramethylphosphonium chloride per day. Column 3 is operated at a pressure of 150 p.s.i.a., at a total condenser temperature of 120° F. and a reboiler temperature of 185° F. The overhead taken through line 18 amounts to 445 pounds of methyl chloride per day and 50 pounds of phosgene per day and the bottoms taken through line 20 amount to 1222 pounds of phosgene per day and 15 pounds of phosphorus oxychloride per day.

Column 4 is operated at a pressure of 7.5 p.s.i.a., at a total condenser temperature of 180° F. and at a reboiler temperature of 290° F. The overhead taken through line 21 amounts to one pound of phosgene per day, 1490 pounds of phosphorus oxychloride per day and 13 pounds of "dichloride" per day and the bottoms taken through line 23 amount to 30 pounds of phosphorus oxychloride per day, 6917 pounds of "dichloride" per day and 89 pounds of tetramethylphosphonium chloride per day. Column 5 is operated at a pressure of 1.5 p.s.i.a. and at a temperature of 240° F. All of the bottoms taken from column 4 are introduced into column 5. The overhead from column 5 amounts to 30 pounds of phosphorus oxychloride per day and 6904 pounds of "dichloride" per day and the bottoms from column 5 amount to 13 pounds of "dichloride" per day and 89 pounds of tetramethylphosphonium chloride per day.

The process which we have invented is of utility in the recovery of methyl dichlorophosphine oxide from a reaction mixture produced by reacting phosgene with pyro mix. When that phosgenation reaction is carried out in the presence of solvent methyl dichlorophosphine oxide, as described in the aforementioned Lutz and Smith application, some variation will be encountered in the relative proportions of the various ingredients present in the phosgenation reaction product. Essentially, however, that reaction product is a mixture of carbon dioxide, hydrogen chloride, phosgene, and methyl dichlorophosphine oxide together with very small amounts of methyl chloride, phosphorus oxychloride, tetramethylphosphonium chloride and higher boiling materials, such higher boiling materials amounting to about 10 percent by weight of the reaction mixture. In the reaction mixture, the carbon dioxide, hydrogen chloride, methyl chloride, phosgene, phosphorus oxychloride, methyl dichlorophosphine oxide and tetramethylphosphonium chloride, will be present in about the following molar ranges, respectively: 10:16, 6:11, 1:2, 6:25, 1:3, 40:65 and 0.5:1.

The amount of methyl chloride introduced into the first fractionating zone, in addition to that present in the feed can be varied widely, with some effect upon the length of the distilling column required to effect separation at reasonable pressures and temperatures. Usually the amount of methyl chloride introduced into the first distilling zone, including that present in the feed, is within the molar range from about 5 to 20, based upon the molar ranges just stated for carbon dioxide, hydrogen chloride, phosgene, phosphorus oxychloride, methyl dichlorophosphine oxide and tetramethylphosphonium chloride. Likewise, the amount of phosphorus oxychloride introduced into the second distillation zone is subject to considerable variation, the amount so introduced having some effect upon the pressure, temperature and column height required to effect the desired separation. In general, the total amount of phosphorus oxychloride introduced into the second distillation zone, including that present in the bottoms from the first distillation zone is within the molar range from about 5 to 20, the molar ranges for methyl chloride, phosgene, methyl dichlorophosphine oxide and tetramethylphosphonium chloride being the same as those just stated for the entire feed to the first distillation zone.

Also, some variation is permissible in the distillation pressures employed in the various fractionating zones. The first and third fractionating zones should be operated under a moderate pressure, however, generally within the range from about 125 to about 175 p.s.i.a. The second distillation zone is operated at about atmospheric pressure, for example, from about 14 to about 20 p.s.i.a. The fourth distillation zone is operated under a moderate vacuum, for example, from about 5 to 10 p.s.i.a., and when employed, the fifth distillation zone is preferably operated under a high vacuum, for example, 5 p.s.i.a. or below.

We claim:

1. A method for the recovery of methyl dichlorophosphine oxide from a mixture which consists essentially of major amounts of carbon dioxide, hydrogen chloride, phosgene and methyl dichlorophosphine oxide in admixture with small amounts of methyl chloride, phosphorus oxychloride and tetramethylphosphonium chloride which comprises introducing said mixture and additional methyl chloride into a first distillation zone operated at moderate pressure, removing $CO_2$ and HCl as overhead and removing methyl chloride, phosgene, phosphorus oxychloride, methyl dichlorophosphine oxide and tetramethylphosphonium chloride as bottoms; introducing bottoms from the first distillation zone and additional phosphorus oxychloride into a second distillation zone operated at substantially atmospheric pressure, removing methyl chloride and phosgene as overhead and removing phosphorus oxychloride, methyl dichlorophosphine oxide and tetramethylphosphonium chloride as bottoms; introducing overhead from the second distillation zone into a third distillation zone operated at moderate pressure, removing methyl chloride as overhead and removing phosgene as bottoms; and introducing bottoms from the second distillation zone into a fourth distillation zone operated under a vacuum, removing phosphorus oxychloride as overhead and removing methyl dichlorophosphine oxide and tetramethylphosphonium chloride as bottoms; methyl chloride introduced into the first distillation zone being derived from overhead from the third distillation zone and phosphorus oxychloride introduced into the second distillation zone being derived from overhead from the fourth distillation zone.

2. A method according to claim 1 wherein bottoms from the fourth distillation zone are introduced into a fifth distillation zone operated at high vacuum, methyl dichlorophosphine oxide being removed as overhead and tetramethylphosphonium chloride as bottoms.

References Cited by the Examiner

Kinnear et al.: Journal of the Chemical Society (London), 1952, pages 3437–3445.
Kosolapoff: "Organophosphous Compounds" (John Wiley & Sons, Inc., 1950), page 107.
Beilstein 4, 595 (4th ed.), page 595.

References Cited by the Applicant
UNITED STATES PATENTS 2,441,496  5/48  Lincoln et al.

LORRAINE A. WEINBERGER, *Primary Examiner.*

WILLIAM G. WILES, ROGER L. CAMPBELL, *Examiners.*